United States Patent
Sekiguchi

(10) Patent No.: US 8,952,616 B2
(45) Date of Patent: Feb. 10, 2015

(54) APPARATUS FOR CONTROLLING HEAD LAMP FOR VEHICLE

(71) Applicant: Fuji Jukogyo Kabushiki Kaisha, Tokyo (JP)

(72) Inventor: Hiroyuki Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/828,547

(22) Filed: Mar. 14, 2013

(65) Prior Publication Data

US 2013/0257274 A1    Oct. 3, 2013

(30) Foreign Application Priority Data

Mar. 27, 2012   (JP) .................................. 2012-071760

(51) Int. Cl.
  *B60Q 1/02*    (2006.01)
  *F21S 8/10*    (2006.01)
  *B60Q 1/14*    (2006.01)

(52) U.S. Cl.
  CPC *F21S 48/17* (2013.01); *B60Q 1/143* (2013.01)
  USPC ................ 315/82; 315/77; 362/465; 340/936

(58) Field of Classification Search
  USPC .................... 315/77, 82; 250/208.1; 362/460, 362/464–466; 340/933–938
  See application file for complete search history.

(56) References Cited

U.S. PATENT DOCUMENTS

| 6,049,171 A * | 4/2000 | Stam et al. ...................... 315/82 |
| 2004/0143380 A1* | 7/2004 | Stam et al. ...................... 701/36 |
| 2005/0219852 A1* | 10/2005 | Stam et al. .................... 362/466 |
| 2014/0009617 A1* | 1/2014 | Utagawa et al. .............. 348/148 |

FOREIGN PATENT DOCUMENTS

| JP | 07-069125 A | 3/1995 |
| JP | 2000-211422 A | 8/2000 |
| JP | 2000-233683 A | 8/2000 |
| JP | 2005-092861 A | 4/2005 |
| JP | 2011-037414 A | 2/2011 |
| JP | 2011-131773 A | 7/2011 |
| JP | 2011-246023 A | 12/2011 |

* cited by examiner

*Primary Examiner* — Don Le
(74) *Attorney, Agent, or Firm* — McDermott Will & Emery LLP

(57) ABSTRACT

There is provided an apparatus for controlling a head lamp for a vehicle. A control condition determining unit determines whether a condition for controlling a head lamp is established or not based upon whether a vehicle ahead is present or not, and a distance between the vehicle ahead and the vehicle. When the control condition is determined to be established, an illumination range control unit compares a reference pattern stored and held in a reference pattern holding unit and an illumination pattern of the head lamp recognized by an illumination pattern recognition unit, and controls the illumination range of the head lamp via an actuator in order that both patterns agree with each other.

2 Claims, 4 Drawing Sheets

APPARATUS FOR CONTROLLING HEAD LAMP FOR VEHICLE

CROSS-REFERENCE TO RELATED APPLICATIONS

The present application claims priority from Japanese Patent Application No. 2012-071760 filed on Mar. 27, 2012, the entire contents of which are hereby incorporated by reference.

BACKGROUND OF THE INVENTION

1. Field of the Invention

The present invention relates to an apparatus for controlling a head lamp for vehicle, the apparatus automatically controlling an illumination range of a head lamp mounted to a vehicle.

2. Description of Related Art

Various techniques for controlling, by use of image information, an illumination direction or an illumination range of a head lamp that is mounted to a vehicle such as an automobile for illuminating an environment ahead of the vehicle have been conventionally proposed. For example, Japanese Unexamined Patent Publication (JP-A) No. 2000-233683 describes a technique of controlling a head lamp to constantly have an optimum illumination direction by predicting an advancing direction of the vehicle with an image analysis, and controlling the head lamp to turn.

JP-A No. 2011-246023 describes a technique of controlling an illumination range of light toward the environment in front of a vehicle according to image information obtained by capturing an environment in front of the vehicle and vehicle-ahead information generated based upon road information that has possibility of becoming an obstacle upon detecting a vehicle ahead present in front of the vehicle. According to this technique, precision for detecting the vehicle ahead is enhanced, so that glare is difficult to be applied to the vehicle ahead.

However, the techniques described in the Publications described above do not assume the case in which the optical axis of the head lamp is shifted from a prescribed adjustment value. Therefore, according to these techniques, an appropriate illumination area of the head lamp cannot always be secured during when the vehicle travels.

BRIEF SUMMARY OF THE INVENTION

The present invention is accomplished in view of the above-mentioned circumstance, and aims to provide an apparatus for controlling a head lamp for vehicle that can always secure an appropriate illumination area of the head lamp during when a vehicle travels.

An aspect of the present invention provides an apparatus for controlling a head lamp for vehicle that automatically controls an illumination range of a head lamp mounted to a vehicle. The apparatus includes: a reference pattern holding unit for storing and holding an illumination pattern of the head lamp adjusted upon a shipment of the vehicle as a reference pattern; a control condition determining unit for determining whether a condition for controlling the head lamp is established or not during when the vehicle travels; an illumination pattern recognition unit for recognizing an illumination pattern of the head lamp by processing an image obtained by capturing an environment in front of the vehicle by a camera; and an illumination range control unit for comparing the reference pattern held in the reference pattern holding unit and the illumination pattern recognized by the illumination pattern recognition unit, and controlling the illumination range of the head lamp in order that both patterns agree with each other.

DETAILED DESCRIPTION OF THE INVENTION

Hereinafter, an embodiment of the present invention will be described with reference to the drawings.

Figure 1:
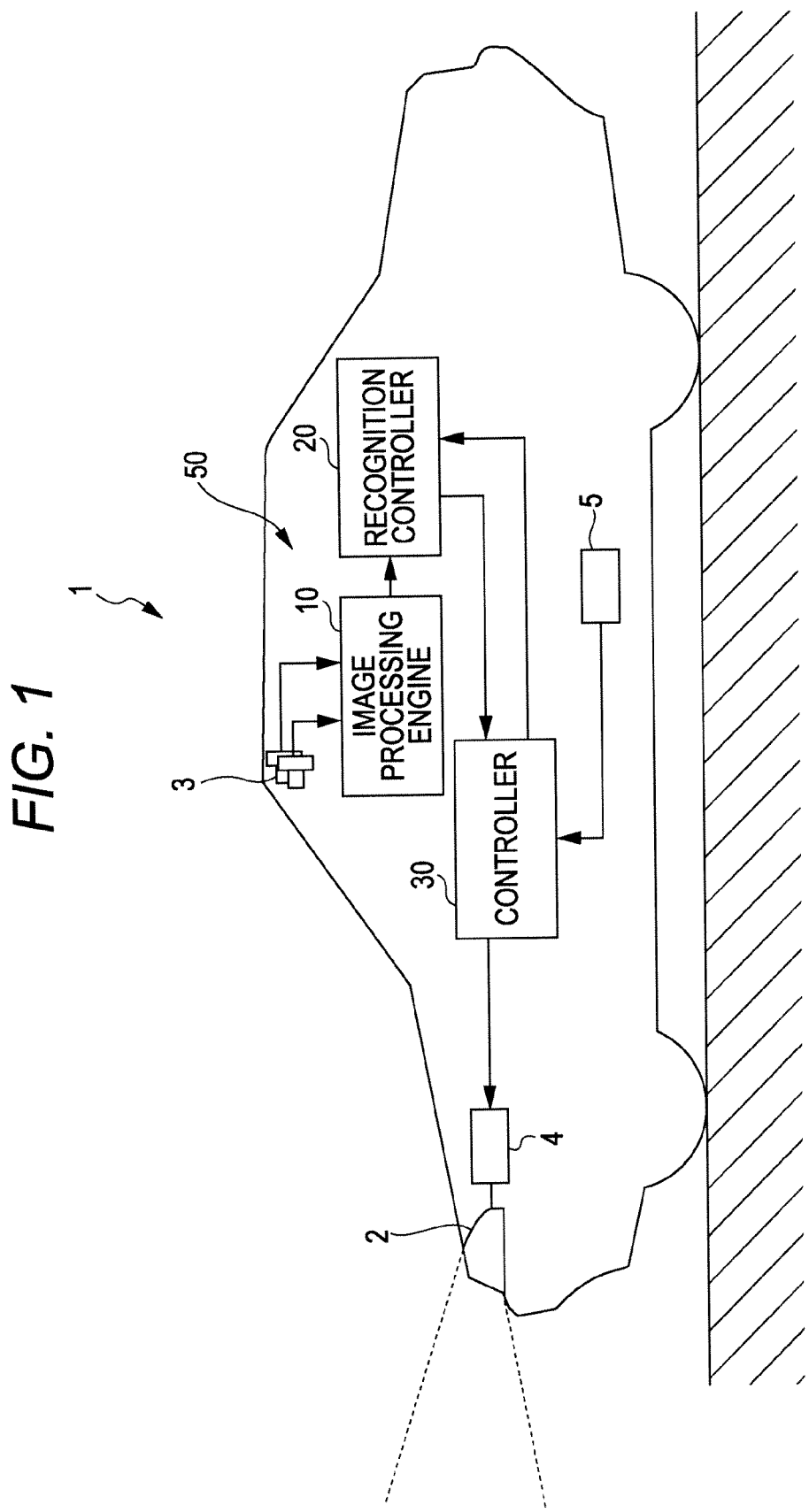
FIG. 1 is a diagram illustrating a configuration of an apparatus for controlling a head lamp.

In FIG. 1, a vehicle 1 such as an automobile includes an apparatus for controlling a head lamp (hereinafter merely referred to as "control apparatus") 50. The control apparatus 50 automatically controls an illumination range of right and left head lamps 2, which illuminate an environment in front of the vehicle with light, by using an image of a camera 3 that captures an environment in front of the vehicle. The control apparatus 50 includes an image processing engine 10, a recognition controller 20, and a controller 30. The image processing engine 10 performs an image process to an imaging signal from the camera 3. The recognition controller 20 recognizes a three-dimensional object such as a vehicle ahead or a traffic environment such as a road shape, present on the outside of the vehicle 1, based upon information from the image processing engine 10. The controller 30 controls to drive right and left actuators 4, which control an illumination range of the right and left head lamps 2, based upon information from the recognition controller 20, and vehicle information of the vehicle 1 detected by various sensors 5 including a speed sensor, an acceleration sensor, and a yaw rate sensor.

In the present embodiment, the camera 3 capturing an environment in front of the vehicle 1 is a stereo camera that captures an object from different angles of view. The camera 3 is configured as a camera unit including two cameras, each having an image sensor such as CCD or CMOS. These two cameras are mechanically fixed with a predetermined base length (distance between optical axes) in order that the optical axes of both cameras are almost parallel to each other. For example, the camera 3 is mounted on a front window at an upper part of a vehicle compartment. In the present embodiment, a case in which a stereoscopically captured image by using two cameras is processed will be described. However, a single camera may be used.

The image processing engine 10 that processes the image captured by the camera 3 processes the image of the surrounding environment at the outside of the vehicle 1 captured by the camera 3 according to a stereoscopic image processing, thereby acquiring three-dimensional distance information. Specifically, the image processing engine 10 calculates a deviation amount of corresponding positions from a pair of images captured by the camera 3 according to a block matching, and generates three-dimensional distance information based upon the deviation amount as a distance image. The distance image generated by the image processing engine 10 is read by the recognition controller 20, and the recognition controller 20 performs a process of recognizing a white line on a road, a vehicle ahead, or an obstacle on the road, by using the original image captured by the camera 3 and the three-dimensional distance information.

The recognition controller 20 performs a process of recognizing the illumination pattern of the head lamp 2 when the head lamp 2 is turned on, and sends the recognized illumination pattern to the controller 30. The controller 30 stores and holds an illumination pattern of the head lamp 2 appropriately adjusted upon the factory shipment of the vehicle 1 as a reference pattern. The controller 30 compares the reference pattern and the illumination pattern of the head lamp 2, recognized by the recognition controller 20, of the traveling vehicle 1, and controls the head lamp 2 to have an appropriate illumination range by the actuator 4.

Figure 2:
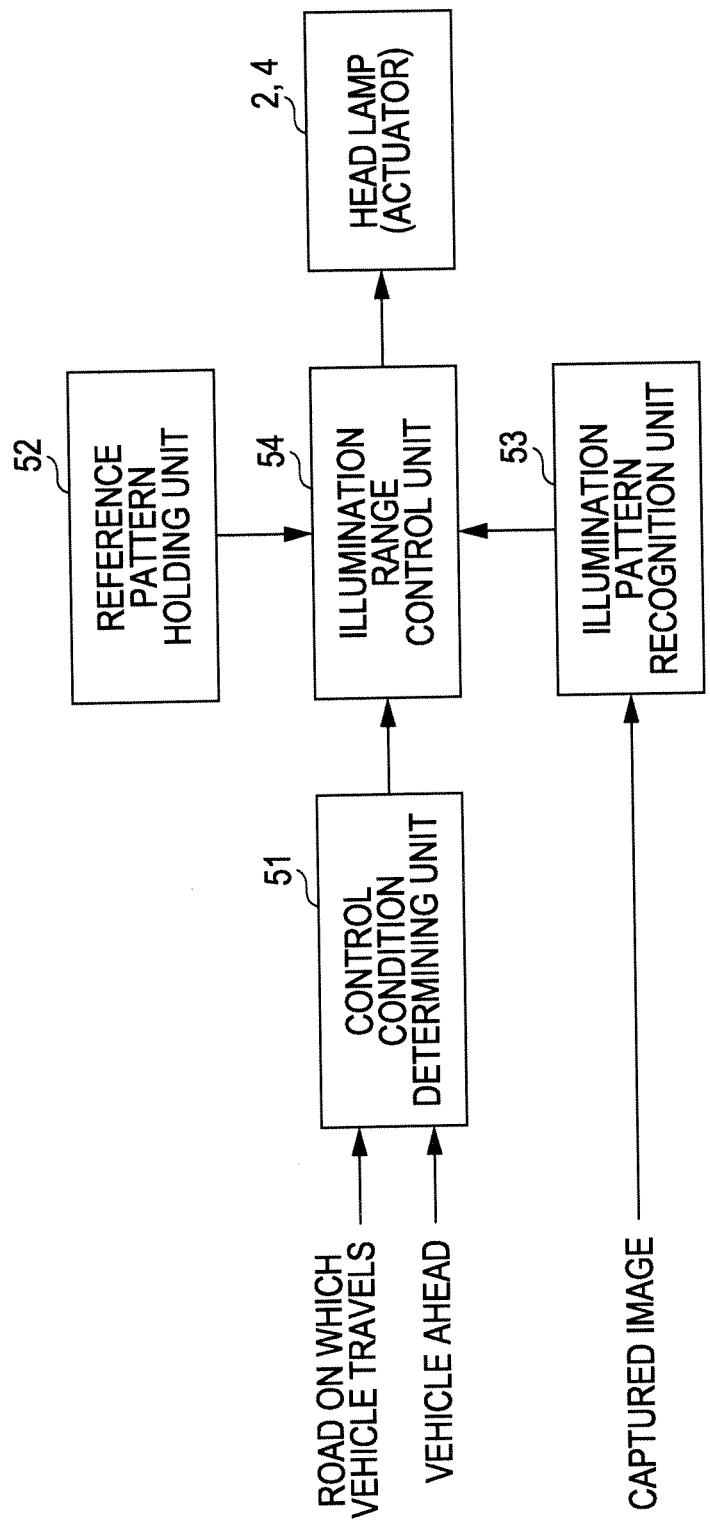
FIG. 2 is a block diagram illustrating a head lamp controlling function.

As illustrated in FIG. 2, the control function of the head lamp 2 by the recognition controller 20 and the controller 30 can be represented by a control condition determining unit 51, a reference pattern holding unit 52, an illumination pattern recognition unit 53, and an illumination range control unit 54. These units are operated when a light switch, not illustrated, turns on the head lamp 2. Generally, the control condition determining unit 51 determines whether a condition for controlling the head lamp 2 is established or not based upon at least whether a vehicle ahead is present or not and the distance between the vehicle 1 and the vehicle ahead. When the control condition determining unit 51 determines that the control condition is established, the illumination range control unit 54 compares the reference pattern stored in the reference pattern holding unit 52 and the illumination pattern of the head lamp 2 recognized by the illumination pattern recognition unit 53, and controls the illumination range of the head lamp 2 by the actuator 4 in order that both patterns agree with each other.

Specifically, the control condition determining unit 51 checks the driving condition on the road on which the vehicle 1 travels as a precondition, and determines whether the head lamp 2 is controlled or not based upon whether the vehicle ahead of the vehicle 1 is present or not, and the distance between the vehicle 1 and the vehicle ahead. For example, a known grouping process is performed to the distance information from the image processing engine 10, and the resultant is compared to a frame (window) of three-dimensional road-shape data, sidewall data, or three-dimensional object data, in order to recognize the vehicle ahead or the road on which the vehicle 1 travels. The control condition determining unit 51 then extracts white-line data, and data of roadside structure such as a guard rail or curb present along the road, and extracts three-dimensional objects as classifying into a motorcycle, a standard-sized car, a large car, a pedestrian, and other three-dimensional objects such as a power pole.

These pieces of data are recognized as data on a coordinate system on the basis of the vehicle 1 in which the vehicle 1 is defined as an origin, the longitudinal direction of the vehicle 1 is defined as an X axis, and the widthwise direction of the vehicle 1 is defined as a Y axis. In the coordinate system, the white-line data, the sidewall data of the guard rail or the curb present along the road, the type of the three-dimensional object, the distance between the vehicle 1 and the three-dimensional object, the central position, the speed, and the like are calculated, whereby a moving member such as an oncoming vehicle or motorcycle moving toward the vehicle 1 is recognized. When a white line is present on the road, the road on which the vehicle 1 travels is recognized as a lane formed based upon the white-line data. When there is no white line, or when the white line cannot be recognized at night, the road on which the vehicle 1 travels is recognized as a lane formed by dividing the road, which is recognized from the data of the roadside object such as the guard rail, into two. A lane acquired from map node information may be recognized as the road on which the moving member travels.

The control condition determining unit 51 determines that the control condition is established, when there is no vehicle in front of the vehicle 1, or when the vehicle in front of the vehicle 1 is far from the vehicle 1, assuming that the vehicle 1 travels on a straight road of which grade is almost horizontal. On the other hand, when the vehicle ahead is detected on the position in relatively a short distance from the vehicle 1, the control condition determining unit 51 determines that the control condition is established, in case where the distance between the vehicle ahead and the vehicle 1 is equal to a distance set beforehand.

The reference pattern holding unit 52 measures the illumination pattern of the head lamp 2 on the vehicle 1 before the factory shipment with the illumination range of the head lamp 2 being preliminarily adjusted, and stores and holds this illumination pattern as the reference pattern. The reference pattern holding unit 52 stores and holds, as the reference pattern, a first reference pattern corresponding to a condition in which a vehicle ahead is not present in front of the vehicle 1, or a condition in which the vehicle ahead is present far from the vehicle 1 by a distance not less than the set distance, and a second reference pattern corresponding to a condition in which the vehicle is present in front of the vehicle 1.

Figure 3:
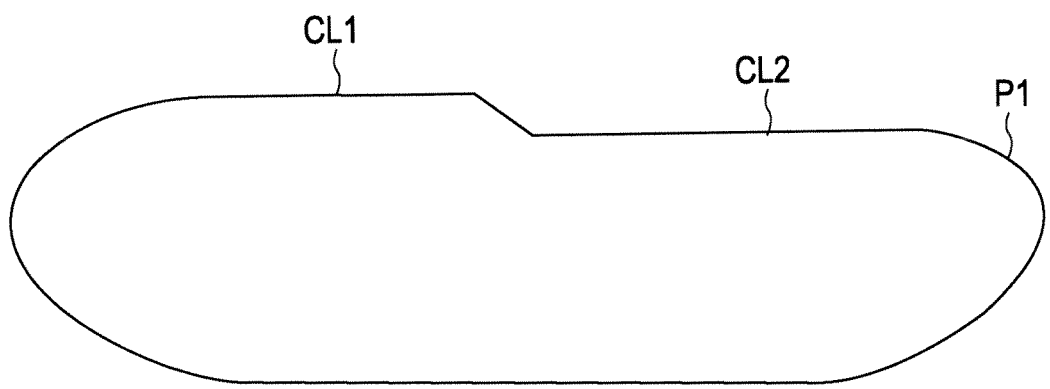
FIG. 3 is an explanatory view of a first reference pattern.
Figure 4:
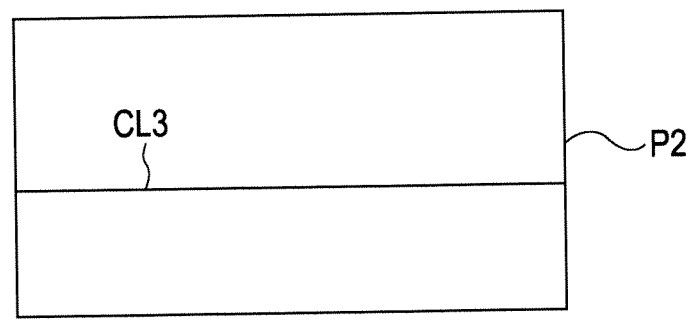
FIG. 4 is an explanatory view of a second reference pattern.

The first reference pattern is an illumination pattern to a screen supposed to be located on a position relatively apart from the vehicle 1, and the reference pattern holding unit 52 stores and holds at least three patterns, i.e., the pattern corresponding to a high-beam lighting state, the pattern corresponding to a low-beam lighting state, and the pattern corresponding to the state in which the vehicle 1 chases the vehicle ahead. For example, as illustrated in FIG. 3, an illumination pattern P1 is stored and held as the reference pattern in the low-beam illumination pattern for left-hand traffic. The illumination pattern P1 is set as an appropriate light-distribution pattern that does not apply glare to an oncoming vehicle or pedestrian, and has uneven cutoff lines CL1 and CL2 respectively on the side near the opposite lane and on the side near the lane on which the vehicle 1 runs. The second reference pattern is an illumination pattern to a screen supposed to be located near the vehicle 1. For example, as illustrated in FIG. 4, a pattern having a cutoff line CL3 with a predetermined height (e.g., about 10 m ahead, and 0.9 m in height) within a region P2 in front of the vehicle 1 by a predetermined distance is stored and held as the second reference pattern.

When the control condition determining unit 51 determines that the control condition is established, the illumination pattern recognition unit 53 performs binarization or an edge detection process to the image captured by the camera 3, thereby recognizing the illumination pattern of the head lamp 2. In this case, the illumination pattern recognition unit 53 only recognizes at least the cutoff line without recognizing the whole illumination pattern from the image, and only checks the deviation from the cutoff lines CL1 and CL2 of the first reference pattern or the cutoff line CL3 of the second reference pattern.

The cutoff line is recognized as described below. Specifically, a pair of pixel groups in which a luminance difference between adjacent pixels in the image is not less than a predetermined value is extracted, and the pixel having the lower luminance value in the pair of pixel groups is extracted as a pixel forming a cutoff line. A straight-line equation formed by the extracted plural pixel groups is calculated by use of Hough transformation, and the cutoff line is derived based upon the straight-line equation.

The illumination range control unit 54 compares the reference pattern stored and held in the reference pattern holding unit 52, and the illumination pattern acquired from the image captured by the camera 3, and controls the illumination range of the head lamp 2 via the actuator 4 in order that at least the cutoff lines of both patterns agree with each other. The actuator 4 is configured as a biaxial actuator having two motors, which can displace the optical axis of the head lamp 2 in the vertical direction and in the lateral direction, or as an actuator including a motor or a solenoid that horizontally moves or rotates a light-blocking plate (shade) arranged in the optical path of the head lamp 2.

A process of a program involved with the control of the illumination range of the head lamp 2 by the respective units described above will be described with reference to a flowchart in FIG. 5.

Figure 5:
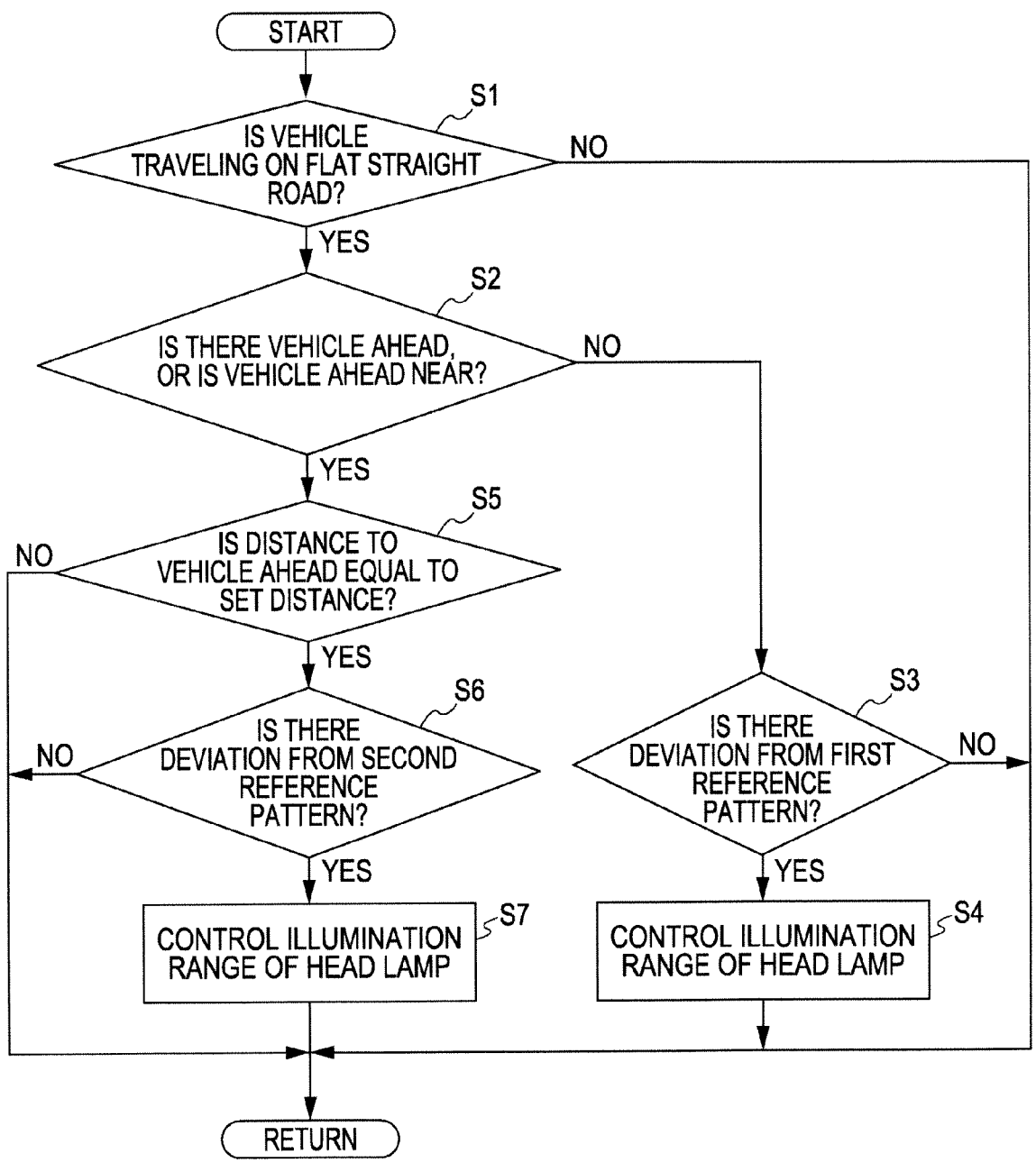
FIG. 5 is a flowchart illustrating an illumination range controlling process.

The process in the flowchart in FIG. 5 is an illumination range control process executed when the head lamp 2 is turned on. In the first step S1, it is checked whether the vehicle 1 currently travels on a flat straight road or not. When the vehicle 1 travels on a curve, climbs up a hill or travels down a slope, not travels on a flat straight road, as a result of the determination, the vehicle 1 exits the current process without executing the head lamp control process. When the vehicle 1 travels on the flat straight road, the vehicle 1 proceeds to step S2 from step S1 to check whether there is a vehicle in front of the vehicle 1 or not.

When there is no vehicle in front of the vehicle 1, or when the vehicle in front of the vehicle 1 is far from the vehicle 1 in step S2, the vehicle 1 proceeds to step S3 to compare the illumination pattern of the head lamp 2 recognized from the image captured by the camera 3 and the first reference pattern that is stored and held beforehand. When the deviation between the recognized illumination pattern and the first reference pattern is within an allowable range, the vehicle 1 exits the current process without executing the head lamp control process. When the deviation between the recognized illumination pattern and the first reference pattern is outside the allowable range, the vehicle 1 proceeds to step S4 to control the illumination range of the head lamp 2 via the actuator 4. In this case, an alarm may be displayed, or the deviation from the first reference pattern may be displayed, in order to allow a driver to know this situation.

On the other hand, when the vehicle ahead is present in relatively short distance from the vehicle 1 in step S2, the vehicle 1 proceeds to step S5 from step S2 to check whether the distance between the vehicle ahead and the vehicle 1 agrees with a set distance (e.g., 10 m) with a predetermined allowable tolerance. When the distance between the vehicle ahead and the vehicle 1 is equal to the set distance, the illumination pattern of the head lamp 2 recognized from the captured image and the second reference pattern that is stored and held beforehand are compared in step S6. When the distance between the vehicle ahead and the vehicle 1 is not equal to the set distance, and when the deviation between the recognized illumination pattern and the second reference pattern is within the allowable range, the vehicle 1 exits the current process without executing the head lamp control process. When the distance between the vehicle ahead and the vehicle 1 is equal to the set distance, and when the deviation between the recognized illumination pattern and the second reference pattern is outside the allowable range, the vehicle 1 proceeds to step S7 to control the illumination range of the head lamp 2 via the actuator 4. Even in this case, an alarm may be displayed, or the deviation from the second reference pattern may be displayed, in order to allow a driver to know this situation.

As described above, in the present embodiment, it is determined whether the condition for controlling the head lamp 2 is established or not based upon whether a vehicle ahead is present or not, the distance between the vehicle 1 and the vehicle ahead, a curvature of the road on which the vehicle 1 travels, and a gradient of a road surface. When it is determined that the control condition is established, the reference pattern stored and held beforehand and the illumination pattern of the head lamp 2 recognized from the captured image are compared, and the illumination range of the head lamp 2 is controlled in order that both patterns agree with each other. Accordingly, the appropriate illumination area of the head lamp 2 can always be secured during when the vehicle 1 travels.

The invention claimed is:

1. An apparatus for controlling a head lamp for a vehicle, the apparatus automatically controlling an illumination range of a head lamp mounted to a vehicle, the apparatus comprising:
    a reference pattern holding unit for storing and holding illumination patterns of the head lamp adjusted upon a shipment of the vehicle as reference patterns, the reference patterns including a first reference pattern corresponding to a condition in which a vehicle ahead of the vehicle is not present in front of the vehicle or a condition in which the vehicle ahead is present far from the vehicle, and a second reference pattern corresponding to a condition in which a vehicle is present in front of the vehicle;
    a control condition determining unit for determining whether a condition for controlling the head lamp is established or not based upon whether a vehicle ahead of the vehicle is present or not, and a distance between the vehicle and the vehicle ahead during the vehicle travels;
    an illumination pattern recognition unit for recognizing an illumination pattern of the head lamp by processing an image obtained by capturing an environment in front of the vehicle by a camera, when it is determined that the condition for controlling the head lamp is established; and
    an illumination range control unit that:
        when it is determined that the condition for controlling the head lamp is established and a vehicle ahead is not present in front of the vehicle or the vehicle ahead is present far from the vehicle, compares the first reference pattern held in the reference pattern holding unit and the illumination pattern recognized by the illumination pattern recognition unit, and controls the illumination range of the head lamp in order that both patterns agree with each other; and
        when it is determined the condition for controlling the head lamp is established and a distance between the vehicle and the vehicle ahead is within a predetermined range, compares the second reference pattern held in the reference pattern holding unit and the illumination pattern recognized by the illumination pattern recognition unit, and controls the illumination range of the head lamp in order that both patterns agree with each other.

2. The apparatus for controlling a head lamp for a vehicle according to claim 1, wherein the camera is a stereo camera for acquiring three-dimensional distance information, and the acquired distance information is used in the control condition determining unit.

\* \* \* \* \*